(12) United States Patent
Schut et al.

(10) Patent No.: US 8,724,214 B2
(45) Date of Patent: May 13, 2014

(54) BROADBAND OPTICAL UPCONVERSION BY ENERGY TRANSFER FROM DYE ANTENNA TO UPCONVERTING CRYSTAL

(75) Inventors: David M. Schut, Philomath, OR (US); Charles G. Dupuy, Corvallis, OR (US); George M. Williams, Portland, OR (US); Thomas L. Allen, Eugene, OR (US)

(73) Assignee: Voxtel, Inc., Beaverton, OR (US)

( * ) Notice: Subject to any disclaimer, the term of this patent is extended or adjusted under 35 U.S.C. 154(b) by 134 days.

(21) Appl. No.: 13/607,408

(22) Filed: Sep. 7, 2012

(65) Prior Publication Data

US 2014/0071517 A1    Mar. 13, 2014

(51) Int. Cl.
*G02F 1/35* (2006.01)
*C09K 11/02* (2006.01)

(52) U.S. Cl.
USPC .................. 359/326; 252/301.16; 252/301.17

(58) Field of Classification Search
None
See application file for complete search history.

(56) References Cited

U.S. PATENT DOCUMENTS

| | | | |
|---|---|---|---|
| 7,094,361 B2 | 8/2006 | Riman et al. | |
| 2003/0030067 A1 | 2/2003 | Chen | |
| 2008/0176076 A1 | 7/2008 | van Veggel et al. | |
| 2010/0103504 A1* | 4/2010 | Lawandy | 359/326 |
| 2011/0127445 A1 | 6/2011 | Zhang et al. | |
| 2012/0009566 A1* | 1/2012 | Soukka et al. | 435/5 |

FOREIGN PATENT DOCUMENTS

WO    WO/2013/022408    2/2013

OTHER PUBLICATIONS

Hardin et al., "Increased light harvesting in dye-sensitized solar cells with energy relay dyes," Nature Photonics, vol. 3 (Jun. 2009), p. 406-411.
Hoke et al., "Modeling the efficiency of Förster resonant energy transfer from energy relay dyes in dye-sensitized solar cells," Optics Express, vol. 18, No. 4 (Feb. 2010), p. 3893-3904.
Hardin et al., "Energy and Hole Transfer between Dyes Attached to Titania in Consensitized Dye-Sensitized Solar Cells," J. Am. Chem. Soc., vol. 133 (2011), p. 10662-10667.
Yum et al., "Incorporating Multiple Energy Relay Dyes in Liquid Dye-Sensitized Solar Cells," Chem. Phys. Chem., vol. 12 (2011), p. 657-661.
Hardin et al., "The renaissance of dye-sensitized solar cells," Nature Photonics, vol. 6 (Mar. 2012), p. 162-169.
Wang et al., "Rare-Earth Ion Doped Up-Conversion Materials for Photovoltaic Applications," Adv. Mater., vol. 23 (2011), p. 2675-2680.
Polman et al., "Broadband sensitizers for erbium-doped planar optical amplifiers: review," J. Opt. Soc. Am. B, vol. 21 (2004), No. 5, p. 871-892.
Leif et al., "Increasing the luminescence of lanthanide complexes," Cytometry A., vol. 69 (2006), No. 8, p. 767-778.
Binnemans, "Lanthanide-Based Luminescent Hybrid Materials," Chem. Rev., vol. 109 (2009), p. 4283-4374.
Zou et al. "Broadband dye-sensitized upconversion of near-infrared light" Nature Photonics, vol. 6, pp. 560-564 (Jul. 2012).

* cited by examiner

*Primary Examiner* — Hemang Sanghavi
(74) *Attorney, Agent, or Firm* — Lumen Patent Firm (57) ABSTRACT

An optical upconverting nanomaterial includes a nanocrystal, a ligand layer directly bonded to the nanocrystal, and an optical antenna directly or indirectly bonded to the nanocrystal. The nanocrystal includes a transition metal-doped material exhibiting upconversion to optical wavelengths. The transition metal-doped material includes energy transfer facilitating transition metal dopants and (not necessarily distinct) emitter transition metal dopants, where an absorption spectrum of the energy transfer facilitating transition metal dopants overlaps with an emission spectrum of the optical antenna. The optical upconverting nanomaterial has at least one linear dimension (e.g., width or thickness) that is less than 150 nm in extent.

37 Claims, 11 Drawing Sheets

Nanocrystal
Type 1
(NC1)

Fig. 4A

Nanocrystal
Type 2
(NC2)

BROADBAND OPTICAL UPCONVERSION BY ENERGY TRANSFER FROM DYE ANTENNA TO UPCONVERTING CRYSTAL

STATEMENT OF GOVERNMENT SPONSORED SUPPORT

This invention was made with Government support under contract W31P4Q-10-C-0144 awarded by Defense Advanced Research Projects Agency (DARPA/AMCOM). The Government has certain rights in this invention.

FIELD OF THE INVENTION

The present invention relates generally to optical materials. More specifically, it relates to nanomaterials that exhibit efficient optical upconversion, e.g., from infrared to visible.

BACKGROUND OF THE INVENTION

Optical upconversion is a process in which a material absorbs two or more photons of lower energy and emits a single photon of higher energy. For example, two infrared photons may be absorbed followed by the emission of a single visible photon. Upconversion is fundamentally different, and far more challenging, than the more common process of down-conversion where a single high energy photon is absorbed followed by the emission of lower energy photons.

Upconversion is desirable in many applications because it can make accessible the optical energy or optical information contained in low energy photons that is otherwise not available to the human eye or to certain classes of photoelectric devices.

Known optical upconversion materials include rare earth doped materials. Such materials, however, are sensitive only at specific wavelengths having a very narrow bandwidth. Another challenge of making such materials practically useful is their low absorption probability. Given the limitations in the state of the art, it would be a valuable advance in the field to provide improved optical upconversion materials.

SUMMARY OF THE INVENTION

The present invention provides for the first time a material exhibiting optical upconversion using an optical antenna (e.g., dye, pigment or nanoparticle) bonded to a transition-metal doped nanocrystal. The nanocrystal itself is small enough not to induce Mie or Rayleigh scattering, essentially rendering the nanomaterial 'invisible'. The advantages of such dye-induced upconversion include the capacity to provide sensitivity to broad-band absorption of light which contrasts to prior material systems limited to the discrete, narrow atomic transitions of the sensitizer ions for upconversion. Another advantage is very large absorption probability and resulting performance compared with known systems. Yet another advantage of the present invention is that it provides the means of differentiating incoming light through the use of various combinations of dyes and dopant materials.

The optical materials of the present invention have many applications including solar cell applications where they may be used to harvest light in the infrared at wavelengths below the bandgap of the solar cell material (typically silicon) and enhance performance of silicon-based photovoltaic systems through the addition of a layer above or below the silicon photovoltaic material. In a related application, the optical materials may be used to extend into the infrared the spectra sensitivity of (low cost) silicon detectors such as used in cameras or other imaging detector arrays used to gather image information about a scene by subsequent signal processing. Yet another application is the use of the optical materials of the present invention in laser threat warning systems, such as thin film optical materials providing visible-to-the-naked-eye indication of presence of infrared laser light, e.g., "false colors" associated with different laser wavelengths (i.e., source recognition) or simple brightness/intensity indication. Another application is the use as a covert marker that may be used for brand protection and identification. Such applications may be embodied as a clear (visible transparent) film that does not distort the viewer's vision.

In one aspect, the invention provides an optical upconverting nanomaterial that includes a nanocrystal, a ligand layer directly bonded to the nanocrystal, and an optical antenna directly or indirectly bonded to the nanocrystal. The nanocrystal includes a transition metal-doped material exhibiting upconversion to optical wavelengths. The transition metal-doped material includes energy transfer facilitating transition metal dopants and (not necessarily distinct) emitter transition metal dopants, where an absorption spectrum of the energy transfer facilitating transition metal dopants overlaps with an emission spectrum of the optical antenna. The optical upconverting nanomaterial has at least one linear dimension (e.g., width or thickness) that is less than 150 nm in extent.

Preferably, a mean distance between the optical antenna and the sensitizer transition metal dopants is less than the Förster radius, so that Förster resonance energy transfer (FRET) may take place.

The transition metal doped material may include, for example, dopants such as $Nd^{3+}$, $Er^{3+}$, $Ho^{3+}$, $Pr^{3+}$, $Dy^{3+}$, $Gd^{3+}$, $Tm^{3+}$, $Tm^{2+}$, $U^{4+}$, $U^{3+}$, $Ti^{2+}$, $Cr^{3+}$, $Ni^{2}+$, $Mn^{2+}$, $Mo^{3+}$, $Re^{4+}$, or $Os^{4+}$.

In some embodiments, a single element serves as both the energy transfer facilitator and emitter, i.e., the energy transfer facilitating transition metal dopants and the emitter transition metal dopants may be identical transition metal ions, e.g., $Er^{3+}$ or $Nd^{3+}$. Preferably, the energy transfer facilitating/emitter dopants have a concentration range of 0.5-30 mol %, or, more preferably 10-30 mol %, or most preferably 15-25 mol %.

In other embodiments, distinct elements serve as energy transfer facilitators and emitter, i.e., the energy transfer facilitating transition metal dopants and the emitter transition metal dopants are distinct elements. In this case, an emission spectrum of the energy transfer facilitator overlaps with an absorption spectrum of the emitter. The energy transfer facilitating transition metal dopants, for example, may be $Yb^{3+}$ or $Er^{3+}$, and the emitter transition metal dopants may be $Er^{3+}$, $Ho^{3+}$, or $Tm^{3+}$. Preferably, the energy transfer facilitating transition metal dopants have a concentration 5-20 times greater than a concentration of the emitter transition metal dopants. For example, the energy transfer facilitating transition metal dopants may have a concentration range of 5-30 mol %, or more preferably 15-25 mol %, and the emitter transition metal dopants have a concentration range of 0.01-10 mol %, or more preferably 0.3-5 mol %, or most preferably 1-3 mol %.

Embodiments of the invention may also include optical nanomaterials that allow for multiple distinct input wavelengths and/or multiple distinct output wavelengths. For distinct output wavelengths, the transition metal-doped material may include second emitter transition metal dopants, where the emitter transition metal dopants and second emitter transition metal dopants have distinct emission spectra. More generally, there may be multiple distinct emitter transition metal dopants. For distinct input wavelengths, the optical nanocrystal may include a second optical antenna bonded to the nanocrystal, where the optical antenna and second optical antenna have distinct absorption spectra, where an absorption spectrum of the energy transfer facilitating transition metal dopants overlaps with an second emission spectrum of the second optical antenna. More generally, there may be multiple distinct optical antennas with distinct absorption spectra.

Embodiments of the invention may also include parallel pathways in the same nanocrystal, using multiple distinct optical antennas and multiple distinct emitter transition metal dopants. For example, the optical nanocrystal may have a second optical antenna bonded to the nanocrystal, where the optical antenna and second optical antenna have distinct absorption spectra, and the transition metal-doped material may have second energy transfer facilitating transition metal dopants and second emitter transition metal dopants, where a second absorption spectrum of the second energy transfer facilitating transition metal dopants overlaps with an emission spectrum of the second optical antenna, and where the emitter transition metal dopants and second emitter transition metal dopants have distinct emission spectra.

In embodiments of the invention, the optical antenna may be composed of an inorganic compound such as $Cr^{3+}$, $Ce^{3+}$, or $UO_2$. In other embodiments, the optical antenna may be composed of a synthetic organic dye, such as: nickel dithiolanes, phthalocyanines/naphthalocyanines, or arylenes.

The optical antenna may be part of the ligand layer directly bonded to the nanocrystal, or the optical antenna may be bonded indirectly to the nanocrystal via a chain linker in the ligand layer. In embodiments where there are multiple optical antennas, each may be independently bonded in either of these two ways to the nanocrystal. In any case, the optical antennas bonded to the nanocrystal preferably number more than $[Ln^{3+}]/\theta\epsilon\eta$, where $[Ln^{3+}]$ is a concentration of the emitting transition metal dopants, $\epsilon$ is an absorptivity of the optical antenna, $\theta$ is a predetermined flux of photons incident on the film, and $\eta$ is a rate of FRET or Dexter energy transfer.

The optical nanomaterial in some embodiments includes an encapsulating layer bonded to the ligand layer. The encapsulating layer may include, for example, an inorganic material, such as $SiO_2$, or a polymer material. In some embodiments, the optical antenna may be incorporated into the encapsulating layer. Other embodiments may include additional ligands attached to the nanocrystal to provide secondary properties such as adhesion to a particular substrate, interaction with a specific biological moiety, solubility within a given matrix/solute, and so on.

The optical nanomaterial as a whole preferably has a transmittance of at least 75% in the visible and/or ultraviolet spectrum.

The optical antenna in particular preferably has a transmittance of at least 75% in the visible and/or ultraviolet spectrum. In addition, the optical antenna preferably has full-width-half-maximum range of absorbance of at least 10 nm, or, more preferably 150 nm, in the near infrared spectrum. The optical antenna also preferably has an absorption coefficient in the near infrared spectrum of at least 10, or more preferably at least 5,000, or in the range of 1,000 to 500,000 in units of $L \cdot mol^{-1} \cdot cm^{-1}$ Preferably, an emission spectrum of the emitter transition metal dopants is in the visible spectrum.

In embodiments where the nanomaterial is a nanoparticle, its largest width is preferably less than 150 nm in extent, or more preferably less than 75 nm in extent. In embodiments where the nanomaterial is a nanotube, its largest width is preferably less than 150 nm in extent, or more preferably less than 75 nm in extent. In embodiments where the nanomaterial is a nanosheet, its largest thickness is preferably less than 150 nm in extent, or more preferably less than 75 nm in extent.

The nanocrystal preferably is a homogeneous nanocrystal. More preferably, the nanocrystal has a phonon energy of at most $1000$ cm$^{-1}$ (i.e., 0.12 eV) and a defect density of at most 0.33 defects per cm$^3$. This low phonon energy serves to minimize the non-radiative relaxation of the excited transition metal atom.

The nanocrystal may be composed of, for example, a metal fluoride, a metal oxide and metal fluoride mixture, a metal oxyfluoride, a metal oxide, or a metal chalcogenide.

In some embodiments, the nanomaterial is a nanoparticle, and the nanocrystal comprises an inner core and an outer shell. The outer shell may be composed of a metal fluoride, a metal oxide and metal fluoride mixture, a metal oxyfluoride, a metal oxide, or a metal chalcogenide.

In another aspect, the invention also provides an optical film comprising multiple distinct types of optical nanomaterials, one type of which includes the optical nanomaterials described above. Such films may be composed of various different types and combinations of optical nanoparticles, nanotubes, and/or nanosheets as described above.

DETAILED DESCRIPTION

Unless otherwise qualified, the following definitions shall be considered to apply throughout this description.

Optical means wavelengths in the range 10 nm-1 mm. Infrared (IR) refers to wavelengths in the range 750 nm-10,000 nm. Visible is defined as wavelengths in the range 390 nm-750 nm. Ultraviolet (UV) refers to wavelengths in the range 180 nm-390 nm. Near infrared (NIR) is defined as wavelengths in the range 750 nm-3000 nm.

An optical antenna is defined as the sensitizing element (i.e., organic dye) that converts freely propagating optical radiation into localized energy that it utilized by the emitter to enable upconversion.

Upconversion is defined to specifically refer to luminescence involving the absorption of two or more lower energy (i.e., NIR) photons by a compound followed by emission by the compound of the absorbed energy as a single higher energy (i.e., a visible or UV) photon.

Förster resonance energy transfer (FRET) is defined to specifically refer to a non-radiative energy transfer between two molecules via dipole-dipole coupling. In the case where both molecules are fluorescent, the effect is often called fluorescence resonance energy transfer, although the energy transfer itself is not via fluorescence.

Transition elements/metals are defined herein as elements in the d-block (groups 3 to 12) of the periodic table, and also include the f-block (or "inner transition") elements. That is, lanthanide and actinide series elements are encompassed within the term transition elements. Rare earth elements/metals refer to the 15 lanthanides plus scandium and yttrium.

An organic dye is defined herein to refer to a soluble synthetic organic or natural compound containing a chromophore that absorbs, often strongly, a portion of the optical spectrum. The chromophore is a region of the dye molecule (e.g., conjugated pi system or metal complex) where the energy difference between two molecular orbitals (i.e., the highest occupied molecular orbital and the lowest unoccupied molecular orbital) corresponds to an optical wavelength.

A sensitizer is defined as the organic or inorganic material that absorbs light and transfers that energy, non-radiatively, to either the emitter or to the energy transfer facilitating material.

An energy transfer facilitating material is defined as the transition metal ion that facilitates the non-radiative energy transfer from the sensitizer element to the emitting element of the upconverting material. It has an absorption spectra that overlaps with the emission spectra of the sensitizer while also having an emission spectra that overlaps with the absorption spectra of the emitting element.

Figure 1A:
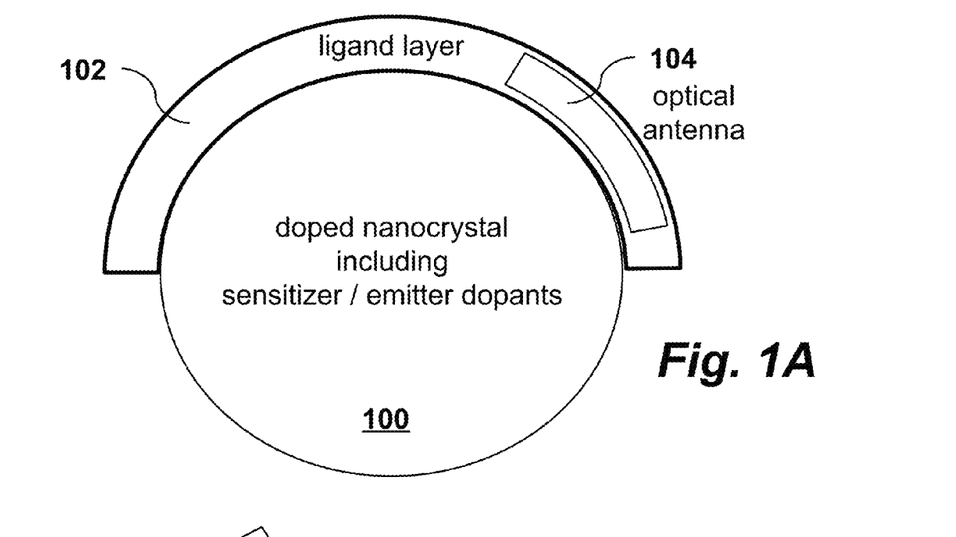
FIGS. 1A-B are schematic diagrams illustrating the structure of optical upconverting nanomaterials according to two embodiments of the invention.
Figure 1B:
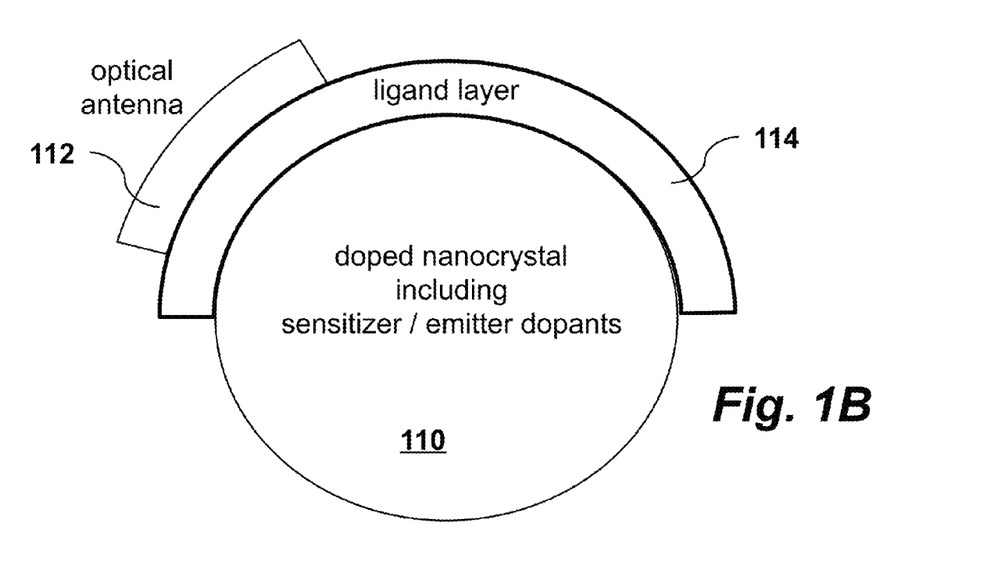

An optical upconverting nanomaterial according to an embodiment of the invention is shown in FIG. 1A. The nanomaterial includes a doped nanocrystal 100, a ligand layer 102 directly bonded to the nanocrystal 100, and an optical antenna 104 directly bonded to the nanocrystal. FIG. 1B shows an alternate embodiment in which an optical antenna 114 is indirectly bonded to the nanocrystal 110 via the ligand layer 112. That is, the optical antenna may be part of the ligand layer and directly bonded to the nanocrystal, as shown in FIG. 1A, or the optical antenna may be bonded indirectly to the nanocrystal via a chain linker in the ligand layer, as shown in FIG. 1B. In some embodiments there may be multiple optical antennas, each bonded to the nanocrystal in either of these two ways.

In embodiments where the nanomaterial is a nanoparticle, its largest width is preferably less than 150 nm in extent, or more preferably less than 75 nm in extent. In embodiments where the nanomaterial is a nanotube, its largest width is preferably less than 150 nm in extent, or more preferably less than 75 nm in extent. In embodiments where the nanomaterial is a nanosheet, its largest thickness is preferably less than 150 nm in extent, or more preferably less than 75 nm in extent.

The nanocrystal preferably is a homogeneous nanocrystal. More preferably, the nanocrystal has a phonon energy of at most $1000\ cm^{-1}$ (i.e., 0.12 eV) and a defect density of at most 0.33 defects per $cm^3$. This low phonon energy serves to minimize the non-radiative relaxation of the excited transition metal atom. The nanocrystal may be composed of, for example, a metal fluoride, a metal oxide and metal fluoride mixture, a metal oxyfluoride, a metal oxide, or a metal chalcogenide.

In some embodiments, the nanomaterial is a nanoparticle, and the nanocrystal comprises an inner core and an outer shell. The outer shell may be composed of a metal fluoride, a metal oxide and metal fluoride mixture, a metal oxyfluoride, a metal oxide, or a metal chalcogenide.

The optical nanomaterial in some embodiments includes an encapsulating layer (not shown) that is bonded to the ligand layer. The encapsulating layer may include, for example, an inorganic material, such as $SiO_2$, or a polymer material. The nanomaterial, whether encapsulated or not, preferably has at least one linear dimension (e.g., width or thickness) that is less than 150 nm in extent and has a transmittance of at least 75% in the visible and/or ultraviolet spectrum.

The nanocrystal 100, 110 includes a transition metal-doped material. For example, the nanocrystal itself may be doped with one or more transition metals. The transition metal-doped material includes energy transfer facilitating transition metal dopants and emitter transition metal dopants. In some embodiments, the sensitizer and emitter dopants are identical elements, while in other embodiments they are distinct. In either case, the emitter transition metal exhibits upconversion to optical wavelengths, and the absorption spectrum of the energy transfer facilitating transition metal dopants overlaps with an emission spectrum of the optical antenna 102, 112. The transition metal dopants may include, for example, $Nd^{3+}$, $Er^{3+}$, $Ho^{3+}$, $Pr^{3+}$, $Dy^{3+}$, $Gd^{3+}$, $Tm^{3}+$, $Tm^{2+}$, $U^{4+}$, $U^{3+}$, $Ti^{2+}$, $Cr^{3+}$, $Ni^{2+}$, $Mn^{2+}$, $Mo^{3+}$, $Re^{4+}$, or $Os^{4+}$. Preferably, an emission spectrum of the emitter transition metal dopants is in the visible spectrum.

In general, there are multiple optical antennas 104, 114 bonded to the nanocrystal. Preferably, the optical antennas number more than $[Ln^{3+}]/\theta\epsilon\eta$, where $[Ln^{3+}]$ is a concentration of the emitting transition metal dopants, $\epsilon$ is an absorptivity of the optical antenna, $\theta$ is a predetermined flux of photons incident on the film, and $\eta$ is a rate of energy transfer.

The optical antenna 104, 114 preferably has a transmittance of at least 75% in the visible and/or ultraviolet spectrum. In addition, the optical antenna preferably has full-width-half-maximum range of absorbance of at least 10 nm, or, more preferably 150 nm, in the near infrared spectrum. The optical antenna also preferably has an absorption coefficient in the near infrared spectrum of at least 10, or more preferably at least 5,000, or in the range of 1,000 to 500,000. Preferably, a mean distance between the optical antenna and the energy transfer facilitating or emitting transition metal dopants is less than the Förster radius, so that Förster resonance energy transfer (FRET) may take place. More precisely, preferably 50% of the energy transfer occurs (potential maximum) when the optical antenna and the energy transfer facilitating transition metal dopant is less than the Förster radius.

Figure 8A:
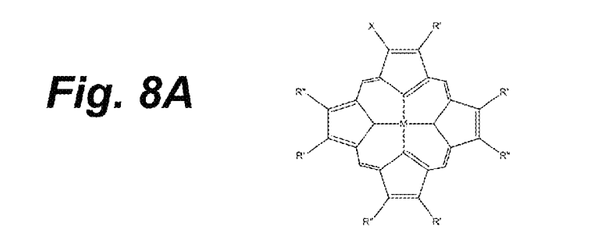
FIGS. 8A-C illustrate examples of organic dyes used as optical antennas in embodiments of the present invention.
Figure 8B:
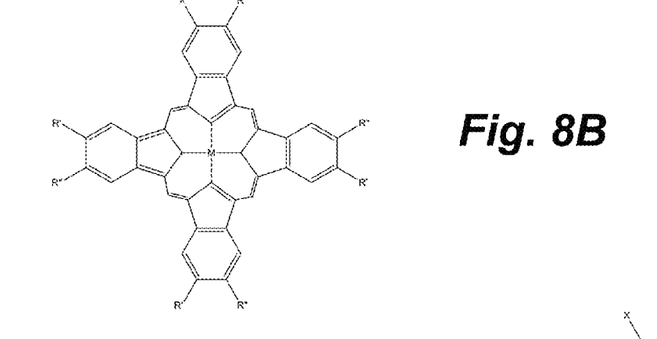
Figure 8C:
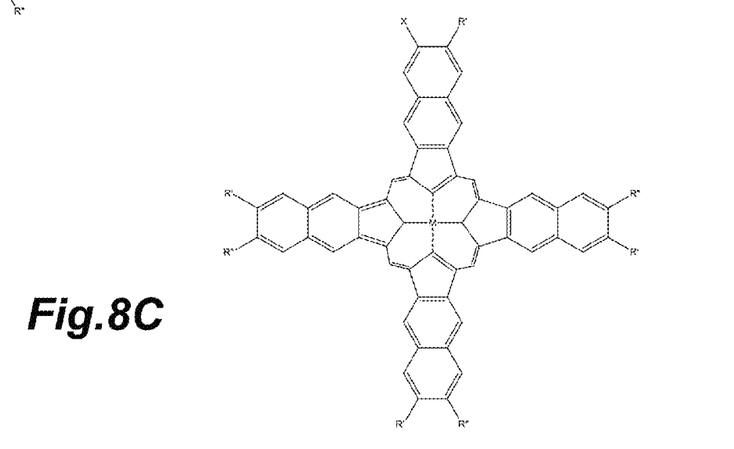
Figure 9:
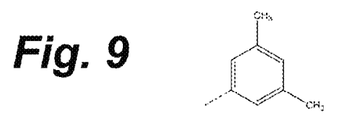
FIG. 9 illustrates a chemical group present as part of organic dyes used as optical antennas in embodiments of the present invention.
Figure 10A:
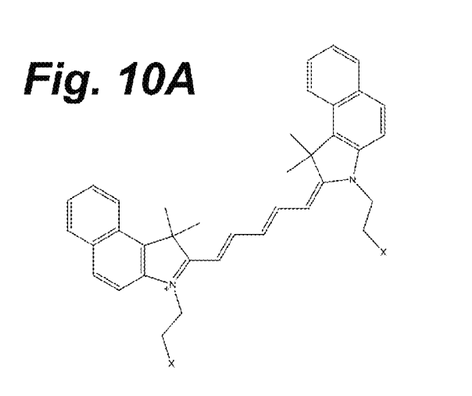
FIGS. 10A-F illustrate examples of organic dyes used as optical antennas in embodiments of the present invention.
Figure 10B:
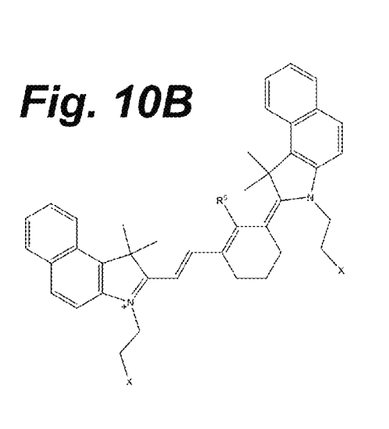
Figure 10C:
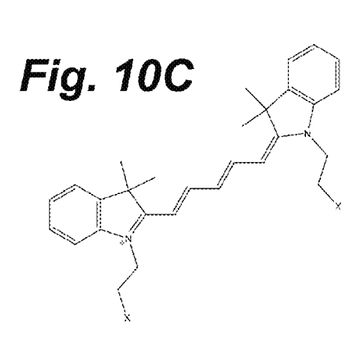
Figure 10D:
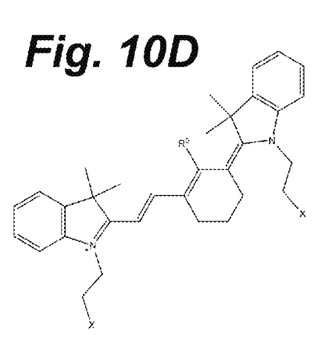
Figure 10E:
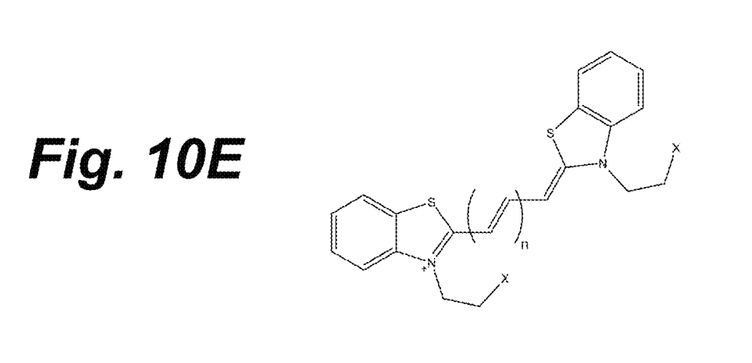
Figure 10F:
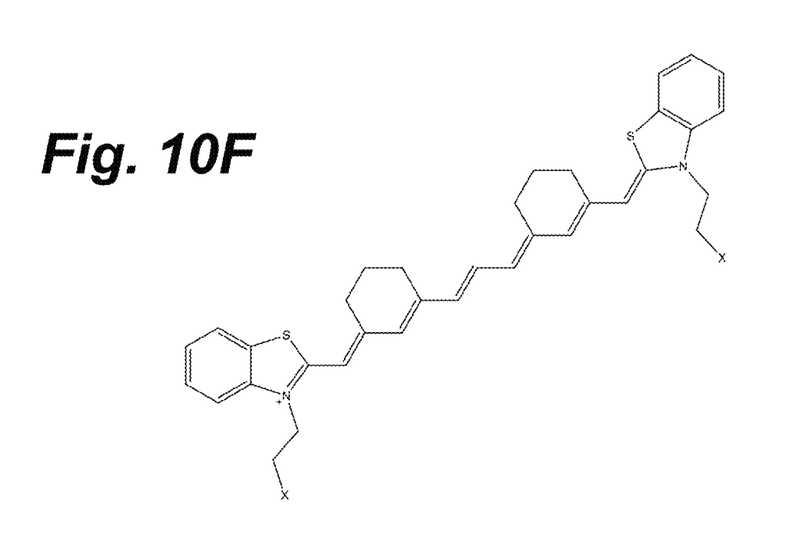
Figure 11:
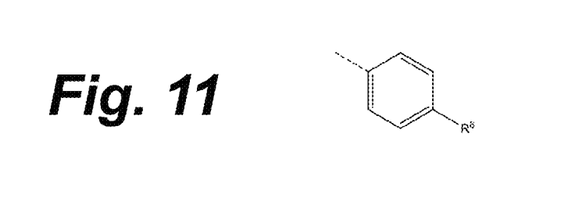
FIG. 11 illustrates a chemical group present as part of organic dyes used as optical antennas in embodiments of the present invention.
Figure 12:
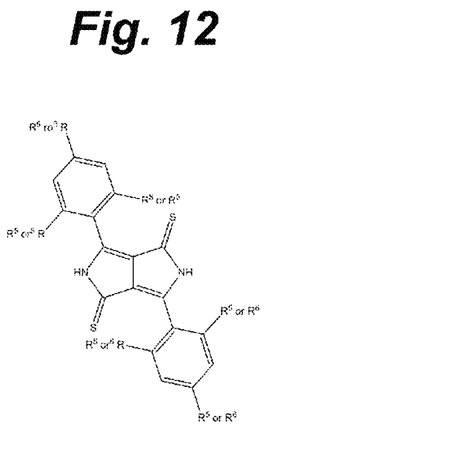
FIG. 12 illustrates an example of an organic dye used as an optical antenna in embodiments of the present invention.
Figure 13:
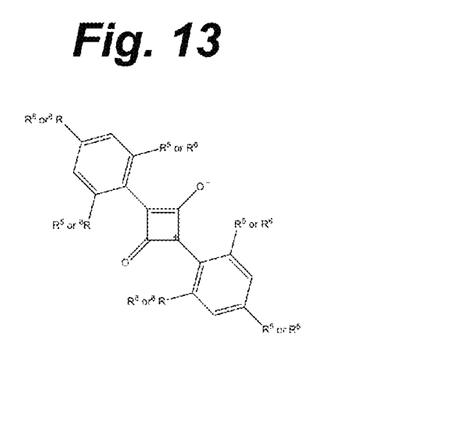
FIG. 13 illustrates an example of an organic dye used as an optical antenna in embodiments of the present invention.
Figure 14:
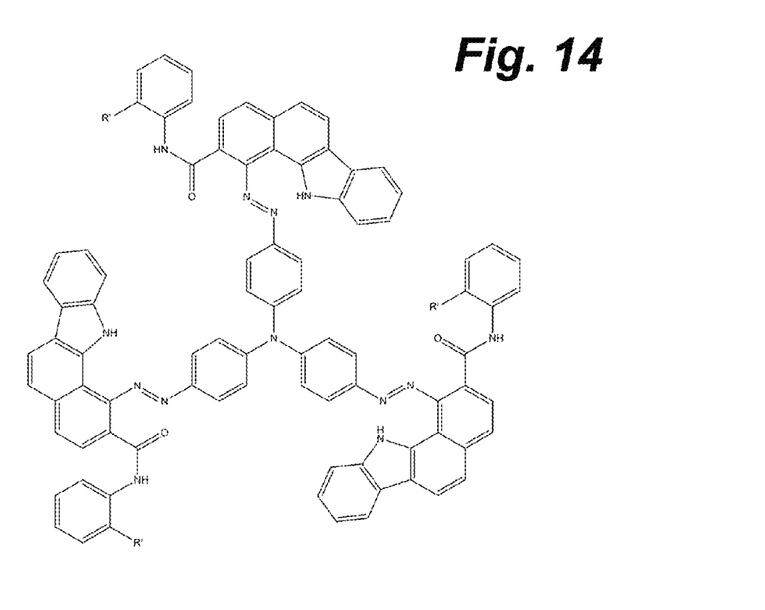
FIG. 14 illustrates an example of an organic dye used as an optical antenna in embodiments of the present invention.

In some embodiments, the optical antenna 104, 114 may be composed of an inorganic compound such as $Cr^{3+}$, $Ce^{3+}$ cerium, or $UO_2$. In other embodiments, the optical antenna may be composed of nickel dithiolanes, phthalocyanines/naphthalocyanines, or arylenes. In still other embodiments, the optical antenna may be composed of a synthetic organic dye. Examples of dyes useful in the context of the present invention are as follows:
1. Dyes of the form X—R, where
X=—$NH_2$, —$CO_2M'$, —SH, —OH,
and where
R=porphyrin (I), phthalocyanine (II), naphthocyanine (III).
2. Dyes of the form shown in FIGS. 8A-C, where
R'=—X, —H, —$(CH_2)_yCH_3$
R"=—R', —X, —H, —$(CH_2)_yCH_3$
M=$H_2$, Cu, Co, $CoR^3$, Ni, $SiR^3R^4$, $AlR^3$, Zn, Fe, $FeR^3$, Mn
y=0-12
$R^3$=—Cl, —$CH_3$, —H, -Ph, —$OCH_3$, —$OCH_2CH_3$
$R^4$=—$R^3$, —Cl, —$CH_3$, —H, -Ph, —$OCH_3$, —$OCH_2CH_3$
Ph=—$C_6H_5$, —$C_7H_8$, or the group shown in FIG. 9.
3. Heptamethines as shown in FIGS. 10A-F, where
$R^5$=—Cl, —H, —NHR", —$NHR^3$, or the group shown in FIG. 11
$R^6$=—$CO_2M'$, —$SO_3M'$, —$R^3$, —R'
M'=K, Li, Na, H
n=1-5
4. Dithiones such as the compound shown in FIG. 12
5. Squaryliums such as the compound shown in FIG. 13
6. Tris azos such as the compounds shown in FIG. 14
7. Dyomics series of dyes: DY-731, DY-732, DY-734, DY-749, DY-750, DY-751, DY-752, DY-776, DY-777, DY-780, DY-781, DY-782, DY-800 and DY-831.

Figure 2A:
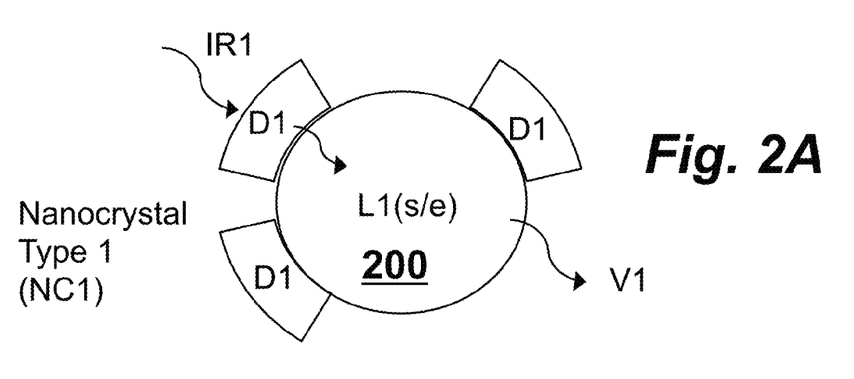
FIGS. 2A-B are schematic diagrams illustrating two types of optical upconverting nanomaterials, each using a single type of optical antenna dye and a single type of transition metal dopant that acts both as an energy transfer facilitator and emitter, according to an embodiment of the invention.
Figure 2B:
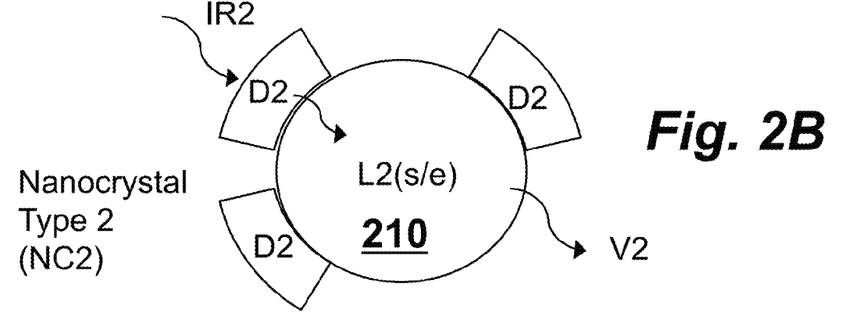

In some embodiments, such as illustrated in FIGS. 2A-B, a single transition element dopant serves as both the energy transfer facilitator and emitter, i.e., the energy transfer facilitating transition metal dopants and the emitter transition metal dopants are identical transition metal ions, e.g., $Er^{3+}$ or $Nd^{3+}$. Preferably, in such embodiments, the energy transfer facilitating/emitter dopants have a concentration range of 0.5-30 mol %, or, more preferably 10-30 mol %, or most preferably 15-25 mol %. FIG. 2A illustrates a nanomaterial of a first type where the nanocrystal 200 is doped with a single type of transition metal dopant L1(s/e) that acts as both the energy transfer facilitator and emitter. FIG. 2B illustrates a nanomaterial of a second type where the nanocrystal 210 is doped with a single type of transition metal dopant L2(s/e) that acts as both the energy transfer facilitator and emitter, where L2(s/e) is a different element than L1(s/e). Attached to nanocrystal 200 is an organic dye D1 optical antenna whose emission spectrum overlaps with the absorption spectrum of the emitting transition metal dopants L1(s/e). Similarly, attached to nanocrystal 210 is an organic dye D2 optical antenna whose emission spectrum overlaps with the absorption spectrum of the emitting transition metal dopants L2(s/e).

In operation, optical antenna D1 in FIG. 2A is excited from a ground state to an excited state by absorption of first infrared photon IR1. The energy transfer facilitator/emitter L1(s/e) is then excited from a ground state to an excited state by FRET transfer of energy from the excited dye, while the dye then returns to its ground state. The dye is then excited a second time (or, if multiple dyes are attached, another of the attached dyes is excited) from its ground state to an excited state by absorption of second infrared photon while the energy transfer facilitator transfers its energy to the emitter. The emitter L1(s/e) is then further excited from its excited state to a doubly-excited state by FRET transfer of energy from the excited dye, either directly or through the use of an energy transfer facilitator, while the dye returns to its ground state. The double-excited emitter L1(s/e) then emits visible light V1 and returns to its ground state, thereby producing a photon of visible light by upconversion of two infrared photons.

With multiple dyes attached to the nanocrystal 200, the first and second excitations of the energy transfer facilitator/emitter may take place as a result of energy transfer from different dyes, provided more than one dye is in position to interact with a given energy transfer facilitator/emitter dopant, thereby increasing the likelihood of a given singly-excited state emitter being further excited to its doubly excited state before said singly excited emitter relaxes back to its ground state via a number of possible deactivation routes. The above energy pathway may also involve a Dexter mechanism instead of FRET transfer.

Figure 5A:
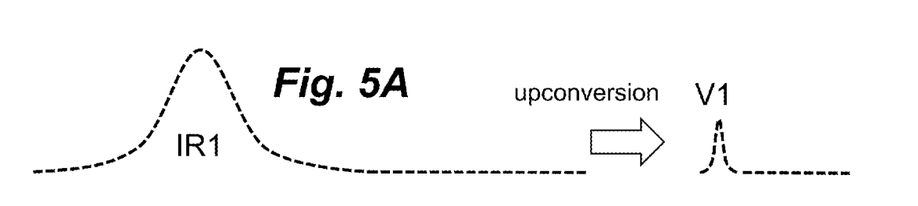
FIGS. 5A-B are schematic diagrams illustrating the optical upconversion from infrared to visible wavelengths produced by the embodiments shown in FIGS. 2A-B, FIG. 3, and FIGS. 4A-B, according to embodiments of the invention.
Figure 5B:
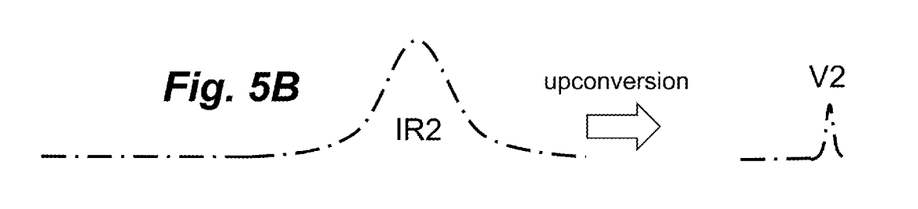

The operation of the nanomaterial of FIG. 2B is identical to that of the nanomaterial of FIG. 2A, except that the wavelength of the infrared light IR2 absorbed by the dye D2 may be different from IR1, and the wavelength of the visible light V2 emitted by the emitter L2(s/e) may be different from V1. FIG. 5A illustrates the upconversion from IR1 to V1 performed by the material of FIG. 2A, while FIG. 5B illustrates the upconversion from IR2 to V2 performed by the material of FIG. 2B.

Figure 5C:
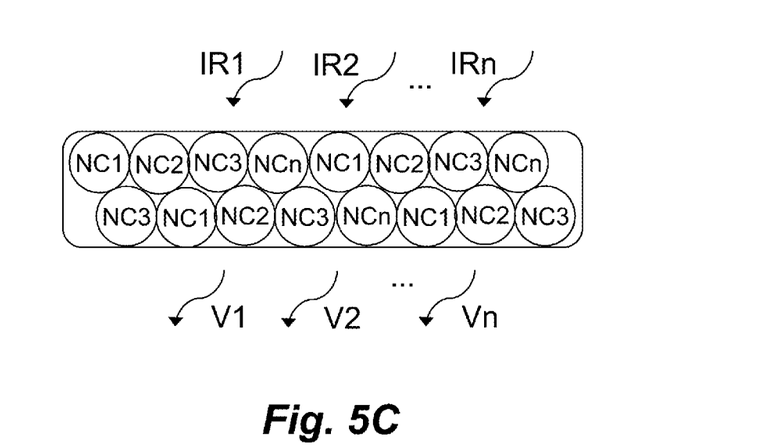
FIG. 5C is a schematic diagram illustrating an optical film composite made of different types of nanoparticles such as those illustrated in FIGS. 2A-B, FIG. 3, and FIGS. 4A-B, according to embodiments of the invention.

Through the use of different dyes and energy transfer facilitating/emitter dopants, many different types of nanocrystals may be fabricated with different input and output wavelength combinations. Such nanocrystals may then be used as components of composite materials having multiple different optical pathways, as shown in FIG. 5C where nanocrystals of n different types are combined in a single composite material film that converts infrared wavelengths IR1, IR2, . . . , IRn to visible wavelengths V1, V2, Vn.

Figure 3:
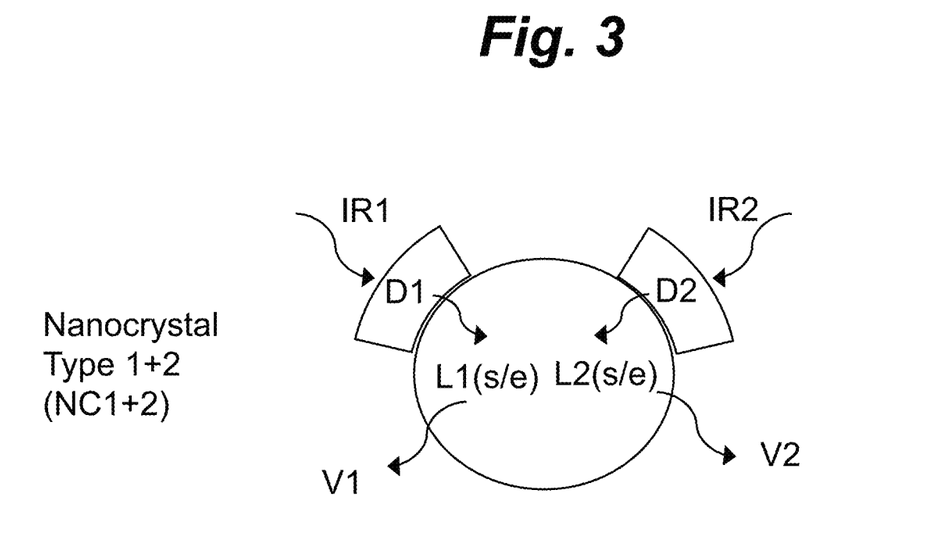
FIG. 3 is a schematic diagram illustrating an optical upconverting nanomaterials combining two types of transition metal dopants and two types of optical antenna dyes to provide two parallel optical pathways in a single nanoparticle, according to an embodiment of the invention.

In some embodiments, multiple such parallel optical pathways may also be integrated within a single nanocrystal, as shown in FIG. 3 which includes two types of dyes D1 and D2 and two types of dopants L1(s/e) and L2(s/e). This single nanocrystal operates as would the combined pair of nanocrystals of FIGS. 2A and 2B, with parallel optical pathways, IR1 being converted to V1 and IR2 being converted to V2. Such nanocrystals can be used in composites of FIG. 5C in place of two different nanocrystal types.

Figure 4A:
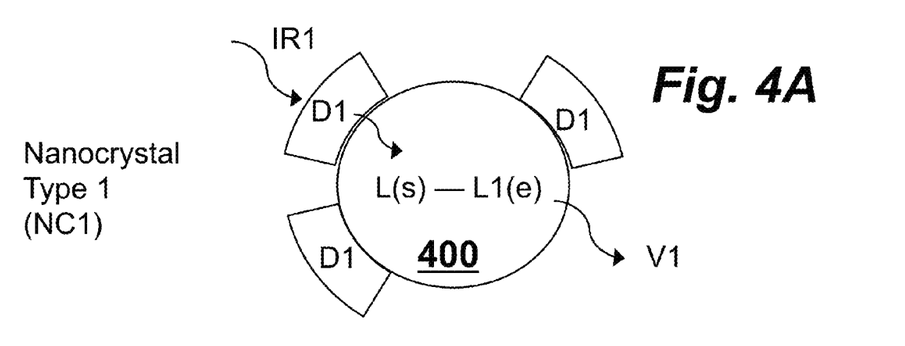
FIGS. 4A-B are schematic diagrams illustrating two types of optical upconverting nanomaterials, each using a single type of optical antenna dye and a matched pair of transition metal energy transfer facilitatorsr and emitter dopants, according to an embodiment of the invention.
Figure 4B:
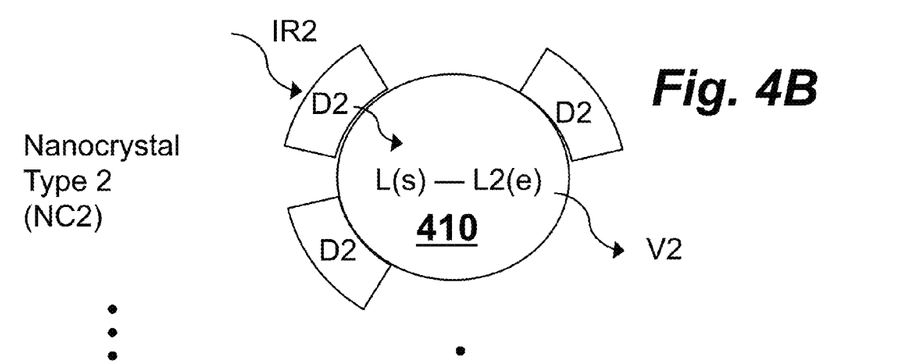

In other embodiments, as shown in FIGS. 4A-4B, distinct elements serve as separate energy transfer facilitator and emitter, i.e., the energy transfer facilitating transition metal dopants and the emitter transition metal dopants are different transition elements. In this case, an emission spectrum of the energy transfer facilitator overlaps with an absorption spectrum of the emitter. FIG. 4A illustrates a nanomaterial of a first type where the nanocrystal 400 is doped with a first type of transition metal dopant L(s) that acts as energy transfer facilitator and a second type of transition metal dopant L1(e) that acts as emitter. The energy transfer facilitator transition metal dopant L(s), for example, may be $Yb^{3+}$ or $Er^{3+}$, and the emitter transition metal dopant L1(e) may be $Er^{3+}$, $Ho^{3+}$, or $Tm^{3+}$. Preferably, the energy transfer facilitating transition metal dopants L(s) have a concentration 5-20 times greater than a concentration of the emitter transition metal dopants L1(e). For example, the energy transfer facilitating transition metal dopants may have a concentration range of 5-30 mol %, or more preferably 15-25 mol %, and the emitter transition metal dopants have a concentration range of 0.01-10 mol %, or more preferably 0.3-5 mol %, or most preferably 1-3 mol %.

In operation, a dye D1 attached to the nanocrystal 400 is excited from a ground state to an excited state by the absorption of first infrared photon IR1. The energy transfer facilitator L(s) is then excited from its initial ground state to an excited state by FRET transfer of energy from the excited dye D1, while the dye returns to its ground state. The emitter L1(e) is then excited from its ground state to an excited state by either a FRET or Dexter energy transfer from the excited energy transfer facilitator, while the energy transfer facilitator returns to its ground state. The dye D1 (or another similar dye) is then excited from its ground state to an excited state by absorption of second infrared photon IR1. The energy transfer facilitator L(s) (or another similar energy transfer facilitator dopant in the crystal) is excited from ground state to excited state by FRET transfer of energy from the excited dye D1, while the dye returns to its ground state. The emitter L1(e) then is further excited from its excited state to a doubly-excited state from the excited energy transfer facilitator, while the energy transfer facilitator returns to its ground state. Finally, the emitter L1(e) emits visible light V1 and returns to its ground state. The above energy pathway may also involve a Dexter mechanism instead of FRET transfer.

The operation of the nanocrystal 410 in FIG. 4B is identical, except that different materials for the dye D2 and emitter L2(e) can be used to select specific desired input wavelength IR2 distinct from IR1 and specific desired output wavelength V2 distinct from V1. FIG. 5A illustrates the upconversion from IR1 to V1 performed by the material of FIG. 4A, while FIG. 5B illustrates the upconversion from IR2 to V2 performed by the material of FIG. 4B. A variety of different such nanoparticle types may be fabricated through the appropriate selection of different materials for dyes and dopants and used to create composite materials in the same was as described above in relation to FIG. 5C.

Figure 6A:
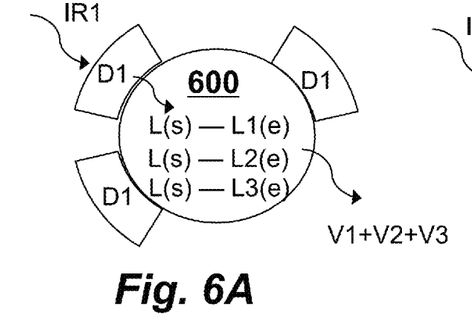
FIGS. 6A-B are schematic diagrams illustrating two types of optical upconverting nanomaterials, each using a single type of optical antenna dye and multiple matched pairs of transition metal energy transfer facilitator and emitter dopants to produce a single input multiple output optical path, according to an embodiment of the invention.
Figure 6B:
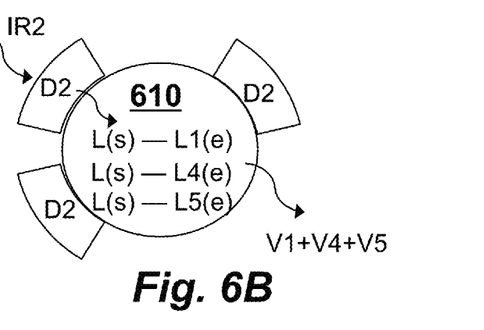

The embodiments thus far described provide distinct parallel optical paths. Embodiments of the invention also include optical nanomaterials that allow for multiple distinct input wavelengths with a single output wavelength and/or multiple distinct output wavelengths with a single input wavelength. FIGS. 6A-B, for example, illustrate embodiments where a single infrared input wavelength produces a selected set of distinct output wavelengths. In these nanocrystals, the transition metal-doped material has multiple different emitter transition metal dopants with distinct emission spectra. Each emitter is matched to the same type of energy transfer facilitating dopant L(s).

Figure 6C:
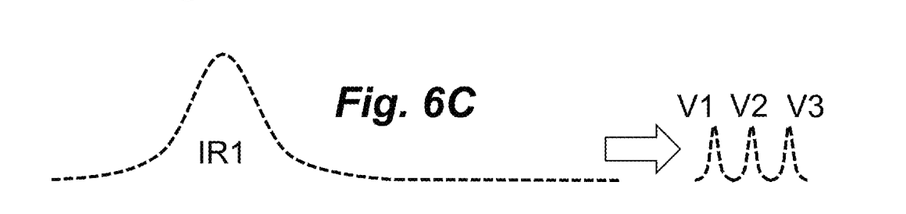
FIGS. 6C-D are schematic diagrams illustrating the optical upconversion from infrared to visible wavelengths produced by the embodiments shown in FIGS. 6A-B, respectively.

FIG. 6A shows a nanoparticle 600 having a dye D1 energy transfer facilitating dopants L(s), and distinct emitter dopants L1(e), L2(e), L3(e). Multiple infrared photons of wavelength IR1 absorbed by D1 excite an energy transfer facilitator L(s) and transfer energy to one of the three emitters L1(e), L2(e), or L3(e), putting it into a doubly-excited state that decays to produce one of three visible wavelengths V1, V2, or V3, respectively. The net effect is that continued irradiation by light at wavelength IR1 produces a combination of visible light at three wavelengths, V1, V2, and V3, as shown in FIG. 6C. The relative intensities of these output wavelengths can be selected by the choice of the concentrations of the emitter dopants.

Figure 6D:
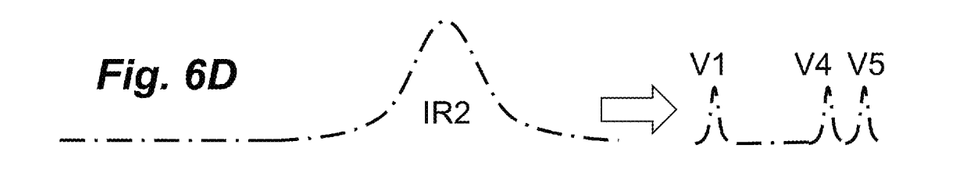

FIG. 6B illustrates a second type of nanoparticle 610 that operates in the same manner, except that it uses a different dye D2 sensitive to infrared wavelength IR2 and uses a different set of three emitter dopants L1(e), L4(e), L5(e) to produce a different combination of visible wavelengths V1, V4, V5 as output, as illustrated in FIG. 6D.

Figure 6E:
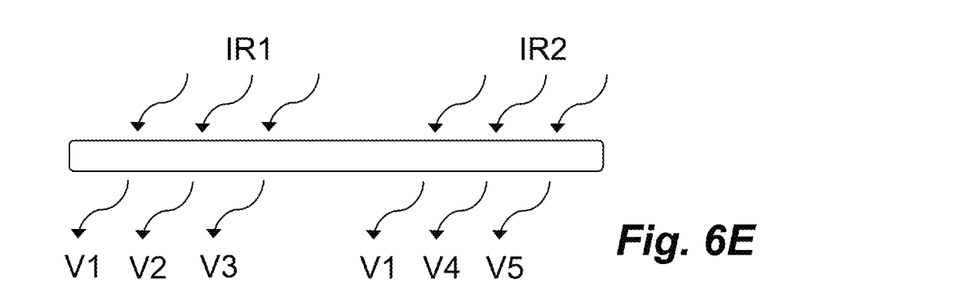
FIG. 6E is a schematic diagram illustrating an optical film composite made of different types of nanoparticles such as those illustrated in FIGS. 6A-B, according to embodiments of the invention.

Although these two examples shown in FIGS. 6A-B illustrate the use of three distinct emitters, in general there may be any number of distinct emitters to produce many different combinations of visible "signatures" which allow for encoding and a larger variety of distinct optical pathways. Additionally, nanoparticles of these different types may be used to form composite material films, such as shown in FIG. 6E, where illumination by IR1 and IR2 produces the combined output of V1, V2, V3, V4, and V5.

Figure 7A:
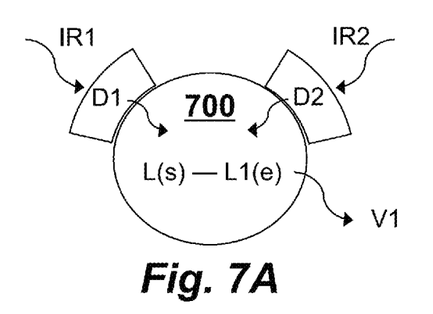
FIGS. 7A-B are schematic diagrams illustrating two types of optical upconverting nanomaterials, each using two types of optical antenna dyes and a single matched pair of transition metal energy transfer facilitators and emitter dopants to produce a multiple input single output optical path, according to an embodiment of the invention.
Figure 7B:
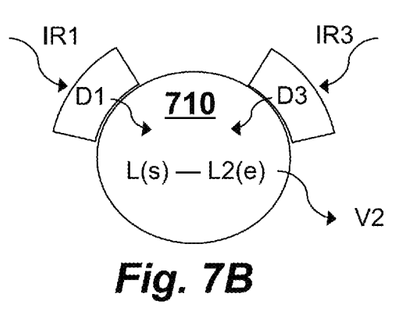

FIGS. 7A-B illustrate embodiments where multiple distinct infrared input wavelengths produce a single output wavelength. In these nanocrystals, the nanoparticle has multiple different dyes with distinct absorption spectra. Each dye is matched to the same energy transfer facilitator and emitter pair, i.e., the distinct dyes have a common emission spectrum matched to the absorption spectrum of the energy transfer facilitating transition metal dopants.

Figure 7C:
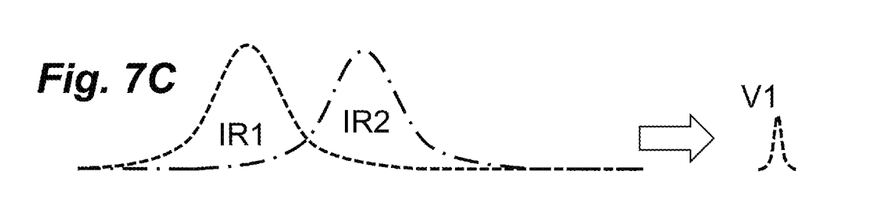
FIGS. 7C-D are schematic diagrams illustrating the optical upconversion from infrared to visible wavelengths produced by the embodiments shown in FIGS. 7A-B, respectively.
Figure 7D:
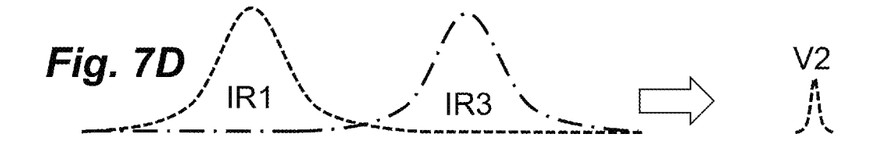

FIG. 7A shows an embodiment having two distinct dyes D1 and D2 attached to a nanocrystal 700 doped by energy transfer facilitator L(s) and emitter L1(e). In operation, incident photons of wavelength IR1 or IR2 may excite D1 or D2, respectively, which in turn transfer energy via L(s) to doubly-excite L1(e), producing a visible photon of wavelength V1, as illustrated in FIG. 7C. By selecting different materials, a different set of input and output wavelengths result, as shown in FIG. 7B which shows a nanoparticle having dyes D1 and D3 attached to nanocrystal 710 doped by energy transfer facilitator L(s) and emitter L2(e). In operation, incident photons of wavelength IR1 or IR3 may excite D1 or D3, respectively, which in turn transfer energy via L(s) to doubly-excite L2(e), producing a visible photon of wavelength V2, as illustrated in FIG. 7D.

Figure 7E:
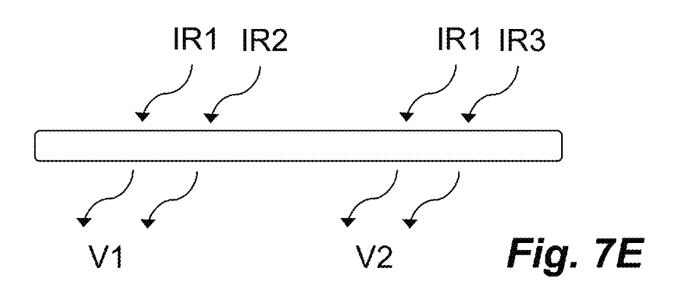
FIG. 7E is a schematic diagram illustrating an optical film composite made of different types of nanoparticles such as those illustrated in FIGS. 7A-B, according to embodiments of the invention.

Although these two examples shown in FIGS. 7A-B illustrate the use of two distinct dyes, in general there may be any number of distinct dyes to produce many different combinations of visible "signatures" which allow for encoding and a larger variety of distinct optical pathways. Additionally, nanoparticles of these different types may be used to form composite material films, such as shown in FIG. 7E, where illumination by IR1, IR2 and IR3 produces the combined output of V1 and V2.

Although the embodiments described above use nanoparticles as illustrative examples, the principles, techniques, and operation of these materials are not limited to nanoparticles but also include nanotubes, nanosheets, and other nano-structured materials.

The optical nanomaterials of the present invention may be fabricated as follows.

Synthesis of Lanthanide-Doped $NaYF_4$ Nanocrystals

As summarized in a recent review article by Wang an Liu [J. Chem. Soc. Rev. 2009, 38, pp 976-989), upconversion has been demonstrated in numerous nanocrystalline materials, including $NaYF_4$, $LaF_3$, $Y_2O_3$, $YVO_4$, etc, which were synthesized using a range of synthetic procedures, including coprecipation, thermal decomposition, sol-gel processing, etc. Here, for purposes of illustration, we describe the synthetic method used to create the lanthanide doped nanoparticle material which was used in one embodiment of the invention. $NaYF_4$ (sodium yttrium tetrafluoride) nanocrystals were synthesized following a modification of Zhang's procedure (Li, Z.; Zhang, Y.; Shuter, B.; Idris, N. Langmuir Lett., 2009, 25, 12015.). The acetate salts of the desired lanthanide elements were purchased from Sigma-Aldrich Co. or from Strem Chemical Inc. and used without further purification. This synthesis technique may be used with any lanthanide element. The chloride and nitrate salts may also be used for this synthesis technique. All other chemicals were purchased from Sigma-Aldrich and used without further purification.

The acetate salts of the lanthanide elements were combined in stoichiometric ratios to yield a total of 1 mmol of lanthanide ion, to which was added 1 mmol of sodium acetate. The lanthanide salts and sodium acetate were mixed with 4 mL oleic acid and 11 mL of 1-octadecene in a 50 mL round bottom flask, heated under vacuum to 120° C. to form a clear solution before cooling to room temperature. A separate solution of ammonium fluoride ($NH_4F$) was made by dissolving 4 mmol of $NH_4F$ in 10 mL of methanol. This was added to the original reaction mixture which resulted in the immediate formation of a white-colored precipitate. The reaction solution was stirred for 30 minutes and then slowly heated to evaporate the methanol. The solution was then degassed by bubbling nitrogen through the solution at 100° C. for 10 minutes. The temperature of the solution was brought to a boil (~324° C.) for 5-15 minutes and allowed to cool to room temperature. The nanocrystals were obtained by precipitating them through the addition of ethanol and centrifuging the liquid at 4000 rpm. The nanocrystal purification was performed by dispersal of the nanocrystals in toluene or cyclohexane and precipitation with a 2x volume to volume ratio of ethanol to nanocrystal solution, followed by centrifugation.

A high resolution transmission electron microscope of the purified nanocrystals shows highly uniform hexagonal rod-shaped nanoparticles which grow in both length and width with increased temperature and growth time. An electron diffraction pattern of a single nanoparticle confirms a well-defined hexagonal crystalline structure. An X-ray diffraction pattern confirms that the angular positions of the diffraction peaks match that of the JCPDS 28-1192 standard, although the relative amplitudes are different. This difference is attributed to preferential alignment through self-assembly of the hexagonal rods of the measured sample.

As those skilled in the art will appreciate, one can make small changes to the above synthesis to produce nanocrystals in the form of nanorods or nanosheets.

Attachment of sensitizer/dye-antenna to $NaYF_4$:$Ln^{3+}$ nanocrystals

The near infrared absorbing dyes were purchased from several suppliers (Crysta-Lyn Chemical Company, Dyomics GmbH, Sigma-Aldrich, and Pierce-Thermo Scientific as examples). Dyes used contained either a carboxylic acid group (—$CO_2H$), an isothiocyanate group (—N=C=S), or N-hydroxysuccinimide (NHS) group, which are used to form a covalent linkage with amines to form an amide bond.

A number of techniques are known in the art for attaching organic molecules to nanoparticles. The techniques described below adapt these techniques for the optical antenna application in order to ensure a very short linkage (separation distance) because of the short interaction range of the FRET or Dexter transfer. As those skilled in the art will appreciate, the following techniques for attaching anntennas to the nanocrystals can be readily adapted to attach any of various types of optical antennas, whether directly or indirectly via a chain linker, as well as to attach multiple distinct types of antennas to a single nanocrystal.

Example #1

Encapsulation of Attached Dye 80 mg (~0.3 mmol) of $NaYF_4$:$Ln^{3+}$ nanoparticles having an oleic acid ligand shell are dispersed in 30 mL of cyclohexane while stirring. In a separate vessel, 700 µL of surfactant (Igepal CO-520) is stirred into 40 mL of cyclohexane. The surfactant mixture is then added to the nanoparticle solution. In another vessel, 600 µL of ammonium hydroxide ($NH_4OH$, 30% in water) is stirred into 3 mL of Igepal CO-520. This is then added to the nanoparticle solution to form a clear solution. The reaction is then sonicated for a minimum of 20 minutes to create a reverse microemulsion.

The attachment of the dye to the amine-containing siloxane monomer, 3-aminopropyl trimethoxysilane (APS), is performed in a separate vessel in which 300 µL of 2 mmol NIR dye in ethanol ($6 \times 10^{-7}$ mol) is stirred in a 10 fold excess of APS (50 µL of 0.1 M APS in cyclohexane) for 40 minutes. The solution of dye-attached APS is added to the reverse microemulsion of nanoparticles and stirred vigorously for 2 hours to form the inner silica shell encapsulating layer with attached dye. 400 µL of neat TEOS (tetraorthosilicate) is added and stirred vigorously overnight. All reactions were performed at room temperature.

The silica-coated, dye-attached nanoparticles are precipitated from the reaction mixture with twice the volume of ethanol to volume of reaction mixture, then centrifuged at 4000 RPM for 10 minutes. The precipitate is washed with a 50:50 volume:volume mixture of deionized water and ethanol. The particles are further washed by a twice-repeated process of dispersing the particles in cyclohexane, and then precipitating with a 2x volume of ethanol and centrifuging for 10 minutes.

Example #2

Attachment of Dye to Encapsulated Nanoparticle 80 mg (~0.3 mmol) of $NaYF_4$:$Ln^{3+}$ nanoparticles having an oleic acid ligand shell are dispersed in 30 mL of cyclohexane while stirring. In a separate vessel, 700 µL of surfactant (Igepal CO-520) is stirred into 40 mL of cyclohexane. The surfactant mixture is then added to the nanoparticle solution. In another vessel, 600 µL of ammonium hydroxide ($NH_4OH$, 30% in water) is stirred into 3 mL of Igepal CO-520. This is then added to the nanoparticle solution to form a clear solution. The reaction is then sonicated for a minimum of 20 minutes to create a reverse microemulsion.

To the reverse microemulsion a solution of APS (50 µL of 0.1 M APS in cyclohexane) is added and stirred vigorously for 2 hours to form the silica shell encapsulating layer having an amine functionality. The silica-coated particles are then precipitated from the reaction mixture with twice the volume of ethanol to volume of reaction mixture, then centrifuged at 4000 RPM for 10 minutes. The precipitate is washed with a 50:50 volume:volume mixture of deionized water and ethanol. The particles are further washed by a twice-repeated process of dispersing the particles in cyclohexane, and then precipitating with a 2× volume of ethanol and centrifuging for 10 minutes.

The resulting particles are suspended in 10 mL absolute ethanol by vigorous stirring, to which is added 350 μL of 3 mmol NIR dye in ethanol ($6\times10^{-7}$ mol). The mixture is stirred vigorously for 4 hours. The silica-coated, dye-attached nanoparticles are then precipitated by centrifuging at 4000 RPM for 10 minutes. Excess dye is removed by washing twice by suspending the particles via sonication in 5 mL ethanol, centrifuging at 4000 RPM for 10 minutes, and then discarding the supernatant.

Fabrication of Films

Transparent films composed of nanoparticles of the present invention may be fabricated using various known techniques. For example, drops of nanoparticles-with-dye may be placed onto a glass slide and allowed dry. Alternatively, the nanoparticles may be suspended in a PMMA casting solution to make a thermal cured film. Another approach is to use an acrylic neutral base from an artist's supply store.

Transparent films composed of nanoparticles of the present invention may be fabricated using various known techniques. For example, the nanoparticles may be suspended in a monomeric solution such as methyl methacrylate (MMA), then cured to make polymeric films, or they may be suspended in a neutral acrylic base such as used for pigments and applied as a paint.

As an illustration of one technique for fabricating a film, clear poly(methyl methacrylate) (PMMA) films of 1-3% by weight loading of nanoparticles were made using a modified version of the procedure of Boyer et al. [Chem. Mater. 2009, 21, pp. 2010-2012] Nanoparticles are dispersed in tetrahydrofurane (THF) at low concentration (0.05M or less) to which is added poly(ethylene glycol) (PEG)-monooleate ligand at roughly equal weight to that of the nanoparticles. The THF solvent is removed on a rotovap, and the resultant liquid is taken up in methyl methacrylate monomer to create a solution that is 3-10% by weight of nanoparticles. In a separate vessel a casting solution was prepared by dissolving low molecular weight PMMA (Polysciences, Inc. MW 75,000 beads 200 microns) into methyl methacrylate monomer at 30% by weight. The nanoparticle/PEG/MMA solution is mixed at ratio of 1 part to 2.5 with the PMMA casting solution. The resultant mixture is applied with a knife to create a thin film, which is allowed to cure at room temperature. Film quality is greatly improved by degassing the casting solution prior to use.

The invention claimed is:

1. An optical upconverting nanomaterial comprising:
a nanocrystal comprising a transition metal-doped material exhibiting upconversion to optical wavelengths;
a ligand layer directly bonded to the nanocrystal; and
an optical antenna bonded to the nanocrystal;
wherein the transition metal-doped material comprises energy transfer facilitating transition metal dopants and emitter transition metal dopants, wherein an absorption spectrum of the energy transfer facilitating transition metal dopants overlaps with an emission spectrum of the optical antenna;
wherein the optical nanomaterial has at least one linear dimension less than 150 nm in extent.

2. The optical nanomaterial of claim 1 wherein a mean distance between the optical antenna and the energy transfer facilitating transition metal dopants is less than the Förster radius.

3. The optical nanomaterial of claim 1 wherein the transition metal doped material comprises dopants selected from the group consisting of $Nd^{3+}$, $Er^{3+}$, $Ho^{3+}$, $Pr^{3+}$, $Dy^{3+}$, $Gd^{3+}$, $Tm^{3+}$, $Tm^{2+}$, $U^{4+}$, $U^{3+}$, $Ti^{2+}$, $Cr^{3+}$, $Ni^{2+}$, $Mn^{2+}$, $Mo^{3+}$, $Re^{4+}$, and $Os^{4+}$.

4. The optical nanomaterial of claim 1 wherein the energy transfer facilitating transition metal dopants and the emitter transition metal dopants are identical elements.

5. The optical nanomaterial of claim 4 wherein the energy transfer facilitating dopants are $Er^{3+}$ or $Nd^{3+}$.

6. The optical nanomaterial of claim 4 wherein the energy transfer facilitating dopants have a concentration range of 0.5-30 mol %.

7. The optical nanomaterial of claim 1 wherein the energy transfer facilitating transition metal dopants and the emitter transition metal dopants are distinct elements, wherein an emission spectrum of the energy transfer facilitator overlaps with an absorption spectrum of the emitter.

8. The optical nanomaterial of claim 7 wherein the energy transfer facilitating transition metal dopants are $Yb^{3+}$ or $Er^{3+}$.

9. The optical nanomaterial of claim 7 wherein the emitter transition metal dopants are $Er^{3+}$, $Ho^{3+}$, or $Tm^{3+}$.

10. The optical nanomaterial of claim 7 wherein the energy transfer facilitating transition metal dopants have a concentration 5-20 times greater than a concentration of the emitter transition metal dopants.

11. The optical nanomaterial of claim 7 wherein the energy transfer facilitating transition metal dopants have a concentration range of 5-30 mol %, and wherein the emitter transition metal dopants have a concentration range of 0.01-10 mol %.

12. The optical nanomaterial of claim 1 wherein the transition metal-doped material comprises second emitter transition metal dopants, wherein the emitter transition metal dopants and second emitter transition metal dopants have distinct emission spectra.

13. The optical nanomaterial of claim 1 wherein the optical nanocrystal comprises a second optical antenna bonded to the nanocrystal, wherein the optical antenna and second optical antenna have distinct absorption spectra, wherein an absorption spectrum of the energy transfer facilitating transition metal dopants overlaps with a second emission spectrum of the second optical antenna.

14. The optical nanomaterial of claim 1 wherein the optical nanocrystal comprises a second optical antenna bonded to the nanocrystal, wherein the optical antenna and second optical antenna have distinct absorption spectra, wherein the transition metal-doped material comprises second energy transfer facilitating transition metal dopants and second emitter transition metal dopants, wherein a second absorption spectrum of the second energy transfer facilitating transition metal dopants overlaps with an emission spectrum of the second optical antenna, wherein the emitter transition metal dopants and second emitter transition metal dopants have distinct emission spectra.

15. The optical nanomaterial of claim 1 wherein the optical antenna is composed of an inorganic compound selected from the group consisting of $Cr^{3+}$, Ce3+, and $UO_2$.

16. The optical nanomaterial of claim 1 wherein the optical antenna is composed of a synthetic organic dye.

17. The optical nanomaterial of claim 16 wherein the optical antenna is composed of nickel dithiolanes, phthalocyanines/naphthalocyanines, or arylenes.

18. The optical nanomaterial of claim 1 wherein the optical antenna is part of the ligand layer directly bonded to the nanocrystal.

19. The optical nanomaterial of claim 1 wherein the optical antenna is bonded indirectly to the nanocrystal via a chain linker in the ligand layer.

20. The optical nanomaterial of claim 1 further comprising an encapsulating layer bonded to the ligand layer.

21. The optical nanomaterial of claim 20 wherein the encapsulating layer is comprises an inorganic material or polymer material.

22. The optical nanomaterial of claim 1 further comprising multiple optical antennas bonded to the nanocrystal, wherein the optical antennas number more than $[Ln^{3+}]/\theta\epsilon\eta$, where $[Ln^{3+}]$ is a concentration of the sensitizer transition metal dopants, $\epsilon$ is an absorptivity of the optical antenna, $\theta$ is a predetermined flux of incident photons, and $\eta$ is a rate of FRET or Dexter energy transfer.

23. The optical nanomaterial of claim 1 wherein the nanocrystal has a transmittance of at least 75% in the visible and/or ultraviolet spectrum.

24. The optical nanomaterial of claim 1 wherein the optical antenna has a transmittance of at least 75% in the visible and/or ultraviolet spectrum.

25. The optical nanomaterial of claim 1 wherein the optical antenna has full-width-half-maximum range of absorbance of at least 10 nm in the near infrared spectrum.

26. The optical nanomaterial of claim 1 wherein the optical antenna has an absorption coefficient in the near infrared spectrum of at least $10$ L·mol$^{-1}$·cm$^{-1}$.

27. The optical nanomaterial of claim 1 wherein an emission spectrum of the emitter transition metal dopants is in the visible spectrum.

28. The optical nanomaterial of claim 1 wherein the nanomaterial is a nanoparticle having a largest width less than 150 nm in extent.

29. The optical nanomaterial of claim 1 wherein the nanomaterial is a nanotube having a largest width less than 150 nm in extent.

30. The optical nanomaterial of claim 1 wherein the nanomaterial is a nanosheet having a thickness less than 150 nm in extent.

31. The optical nanomaterial of claim 1 wherein the nanocrystal comprises a homogeneous nanocrystal.

32. The optical nanomaterial of claim 1 wherein the nanocrystal has a phonon energy of at most 1000 cm$^{-1}$ (i.e., 0.12 eV) and a defect density of at most 0.33 defects per cm$^3$.

33. The optical nanomaterial of claim 1 wherein the nanocrystal is composed of a metal fluoride, a metal oxide and metal fluoride mixture, a metal oxyfluoride, a metal oxide, or a metal chalcogenide.

34. The optical nanomaterial of claim 1 wherein the nanomaterial is a nanoparticle, and the nanocrystal comprises an inner core and an outer shell.

35. The optical nanomaterial of claim 34 wherein the outer shell is composed of a metal fluoride, a metal oxide and metal fluoride mixture, a metal oxyfluoride, a metal oxide, or a metal chalcogenide.

36. An optical film comprising multiple distinct types of optical nanomaterials, one type of which includes the optical nanomaterial of claim 1.

37. An optical film comprising the optical nanomaterial of claim 23.

\* \* \* \* \*